Oct. 23, 1923.
H. T. WEIS
CONVERTIBLE RAKE.
Filed Aug. 31, 1922
1,471,989
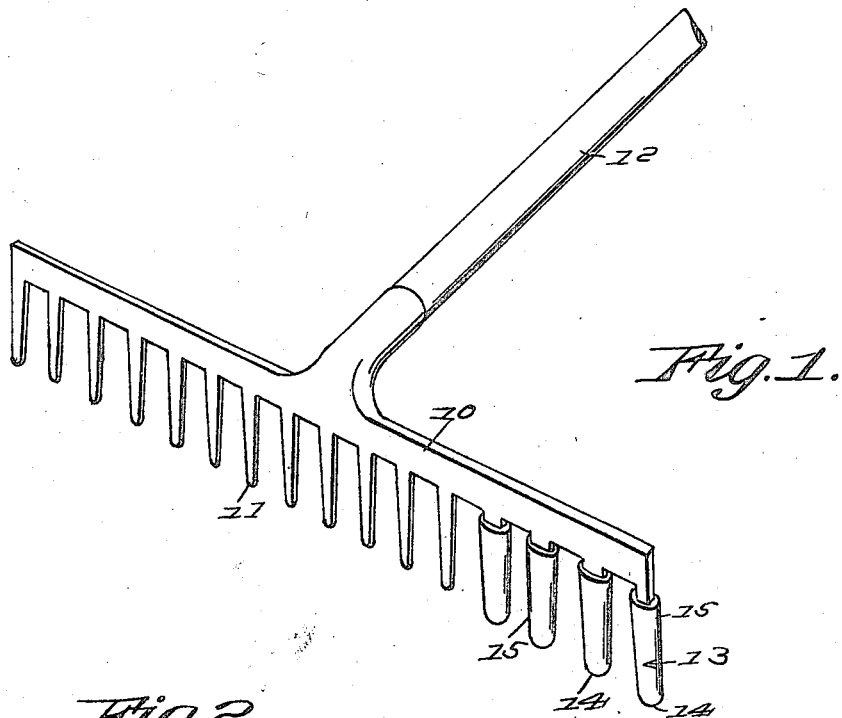
Fig.1.
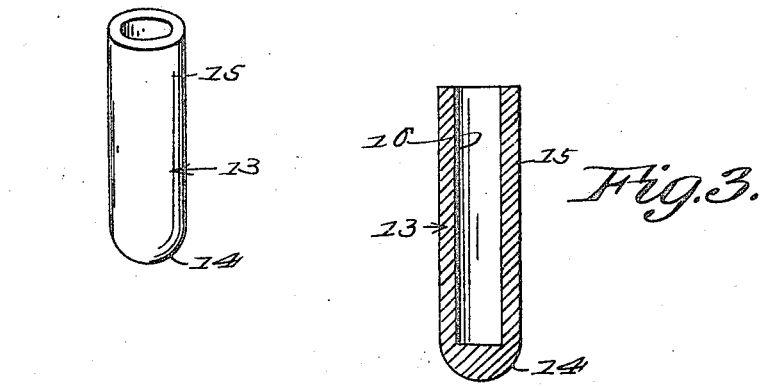
Fig.2.
Fig.3.
Inventor
H. T. Weis,
By _____ Attorney Patented Oct. 23, 1923.

1,471,989

UNITED STATES PATENT OFFICE.

HENRY T. WEIS, OF FAIRMONT, WEST VIRGINIA.

CONVERTIBLE RAKE.

Application filed August 31, 1922. Serial No. 585,459.

*To all whom it may concern:*

Be it known that HENRY T. WEIS, a citizen of the United States of America, residing at Fairmont, in the county of Marion and State of West Virginia, has invented new and useful Improvements in Convertible Rakes, of which the following is a specification.

The object of the invention is to provide simple and efficient means for converting a garden rake of the sharp pronged or toothed type into a lawn rake of the type adapted to gather leaves and grass cuttings without injury to the turf or the roots of the lawn grass, and particularly to provide a means for the purpose indicated which may readily be applied to the prongs or teeth of an ordinary garden rake without other modification in the construction thereof; and with these objects in view the invention consists in a construction and combination of parts of which a preferred embodiment is shown in the accompanying drawings, wherein:—

Figure 1 is a view of a rake of the ordinary garden type having some of its teeth or prongs fitted with grooves or protectors constructed in accordance with the invention.

Figure 2 is a detail view of one of the guard or protecting caps detached.

Figure 3 is a detail sectional view of the same.

The garden rake employed as an illustration in this connection consists of the usual head 10 provided with relatively sharp teeth or prongs 11 and having the usual staff or handle 12, and to convert a rake of this type into a lawn rake suitable for use in gathering mown grass or leaves without injury to the turf there is employed a series of caps 13 of rubber, wood or other material of relatively soft properties having terminal knobs or heads 14 of rounded or spherical form, the stems 15 of said caps being hollow for the reception of the teeth or prongs of the rake head and being adapted to frictionally receive and fit said teeth or prongs so as to maintain the caps in engagement therewith during the operation of the rake. The bores of the stems may be lined as indicated at 16 with rubber or like frictional material if the caps are not inherently of a frictional material although if the caps are made of rubber it is obvious that such additional linings will not be required. The primary requisite in this connection is that the inner surfaces of the stems constituting the seats for the teeth or prongs of the rake head shall have a frictional engagement with said teeth or prongs of sufficient tenacity to maintain the caps in position thereon while permitting of the forcible removal of the caps from the teeth or prongs when it is desired to use the rake for cultivating or gardening purposes.

Having described the invention, what is claimed as new and useful is:—

The combination with a garden rake head having terminally sharpened permanent teeth, of hollow terminally blunt removable teeth fitted upon and housing said permanent teeth.

In testimony whereof he affixes his signature.

HENRY T. WEIS.